United States Patent [19]

Brooks et al.

[11] Patent Number: 4,679,232
[45] Date of Patent: Jul. 7, 1987

[54] METHOD AND APPARATUS FOR PROVIDING A GROUND REFERENCE FOR TELEPHONE CUSTOMER SPECIAL CIRCUITS POWERED FROM A FLOATING BATTERY FEED

[75] Inventors: Kenneth L. Brooks, Naperville; Paul R. Bufkin, Wheaton; David G. Mihal, Oswego; Jerry G. Miller, Wheaton, all of Ill.

[73] Assignee: American Telephone and Telegraph Company AT&T Bell Laboratories, Murray Hill, N.J.

[21] Appl. No.: 761,888

[22] Filed: Aug. 2, 1985

[51] Int. Cl.⁴ .............................................. H04M 9/00
[52] U.S. Cl. ................................... 379/413; 379/231; 379/322
[58] Field of Search .................... 179/70, 77 R, 84 R, 179/18 H, 18 HB, 16 AA, 16 A, 16 F, 18 FA, 18 AD; 323/281; 379/65, 66, 322, 231, 324, 232, 399

[56] References Cited

U.S. PATENT DOCUMENTS

| 3,649,769 | 3/1972 | Pest | 179/77 |
|---|---|---|---|
| 4,056,689 | 11/1977 | Freimanis | 179/16 F |
| 4,056,691 | 11/1977 | Freimanis et al. | 179/18 FA |
| 4,331,913 | 5/1982 | Sparber | 323/303 |
| 4,419,542 | 12/1983 | Embree et al. | 179/77 |
| 4,423,292 | 12/1983 | Turek | 179/18 FA |
| 4,499,532 | 7/1985 | Hudson et al. | 363/21 |
| 4,551,670 | 11/1985 | Anders et al. | 323/281 |
| 4,593,156 | 6/1986 | Martin | 179/16 AA |

FOREIGN PATENT DOCUMENTS

2065420 6/1981 United Kingdom .................. 179/77

*Primary Examiner*—Gene Z. Rubinson
*Assistant Examiner*—R. Vaas
*Attorney, Agent, or Firm*—Ross T. Watland

[57] ABSTRACT

When a floating battery feed circuit is used to power telephone lines, it is desirable to provide an anti-corrosion biasing circuit to keep the voltage on the tip and ring conductors from becoming positive. This can be done using an anit-corrosion circuit that sinks a dynamic amount of current from the tip conductor. A line circuit including such biasing is, however, incompatible with special lines such as PBX lines that rely on a grounded tip conductor in the talk state. In accordance with the present invention, a constant current is supplied from a ground reference circuit to the ring conductor of such special lines only when loop current is flowing. The magnitude of this supplied current is such that the anti-corrosion circuit holds the tip conductor sufficiently close to ground potential to allow the proper operation of circuits connected to the special lines.

16 Claims, 5 Drawing Figures

METHOD AND APPARATUS FOR PROVIDING A GROUND REFERENCE FOR TELEPHONE CUSTOMER SPECIAL CIRCUITS POWERED FROM A FLOATING BATTERY FEED

TECHNICAL FIELD

This invention relates to telephone channel circuits incorporating a floating battery feed to energize customer equipment and particularly with arrangements for compatibly interfacing a floating battery feed to customer special circuits, e.g., PBX or carrier system circuits, even though such special circuits rely on a ground reference for their proper operation.

BACKGROUND OF THE INVENTION

In telephone systems, channel circuits serve as an interface between communication lines connected to customer equipment and the telephone switching network. In some systems, line concentrators are advantageously employed to allow a number of channel circuits to serve a greater number of lines while still maintaining a completely acceptable level of service. Because of advances in the technology of high-voltage semiconductor devices, such concentrators can now be implemented using semiconductor crosspoints. Although semiconductor concentrators represent a substantial advance in telephony from a number of standpoints, the battery feed provided from channel circuits through a semiconductor concentrator must be capable of floating with respect to ground. An example of a floating battery feed circuit is disclosed in U.S. Pat. No. 4,499,532 issued to R. C. Hudson et al. on Feb. 12, 1985. Because battery feed circuits employed in the past have typically provided a ground reference, many special customer circuits have been designed that rely on the ground reference for their proper operation. Although the number of these special circuits served by switching systems employing a floating battery feed is small compared, for example, to the total number of lines, the cost of replacing or providing customized interfaces for the special circuits represents a significant problem for switching system purchasers.

In view of the foregoing, a recognized problem in the art is the incompatibility of telephone switching equipment relying on a floating battery feed with special customer equipment that requires a ground reference for its proper operation.

SUMMARY OF THE INVENTION

The aforementioned problem is solved and a technical advance is achieved in accordance with the principles of the invention in an illustrative arrangement where an anti-corrosion bias circuit incorporated in the floating-feed channel circuits used for all the switching system lines, sinks a variable amount of ground current from the tip conductor of the lines to prevent a positive potential from being developed thereon, and where a fixed amount of ground current is supplied, advantageously without requiring an additional power supply and illustratively during only one communication state of the line, to the ring conductor of only those lines connected to the above-described special customer circuits to assure that the tip conductor remains sufficiently close to ground potential to provide the reference required for those special circuits.

An arrangement in accordance with the invention is used for interfacing a floating battery feed via a customer loop comprising tip and ring conductors, to a customer circuit. The arrangement includes a biasing circuit coupled to the battery feed and the tip conductor. The biasing circuit sinks a variable magnitude of ground current from the tip conductor dependent on the tip conductor voltage to prevent that voltage from becoming positive with respect to ground. This reduces the known effect of positive potentials causing corrosion of the loop conductors. The arrangement also includes a ground reference circuit including a constant current source for supplying a constant ground current to the loop. A portion of the constant ground current is supplied to the customer circuit thereby permitting proper customer circuit operation.

By way of example, the constant ground current is supplied to the ring conductor of the loop in such manner that the constant current source can be advantageously implemented without requiring an additional DC supply. A loop current detecting switch couples the constant ground current to the ring conductor only when loop current is flowing. This prevents the constant current source from causing anomalous operation during other loop states.

An important advantage of the invention is that the economies inherent in concentration can be obtained in the provision of anti-corrosion biasing circuits while still providing the ground currents required for reference by customer special circuits. An exemplary method in accordance with the invention is used in an arrangement having a number of floating battery feeds for powering a greater number of customer circuits via associated customer loops each comprising tip and ring conductors. At least a given one of the customer circuits requires that a predetermined magnitude of ground current is supplied from the tip conductor of the associated customer loop. According to the method, a variable magnitude of ground current is drawn from the tip conductor of each of the customer loops to prevent corrosion of the loops. A constant ground current at least equal to the predetermined magnitude is supplied to the ring conductor of the customer loop associated with the given customer circuit to ensure proper circuit operation.

BRIEF DESCRIPTION OF THE DRAWING

A more complete understanding of the present invention may be obtained from a consideration of the following description when read in conjunction with the drawing in which.

DETAILED DESCRIPTION

Figure 1:
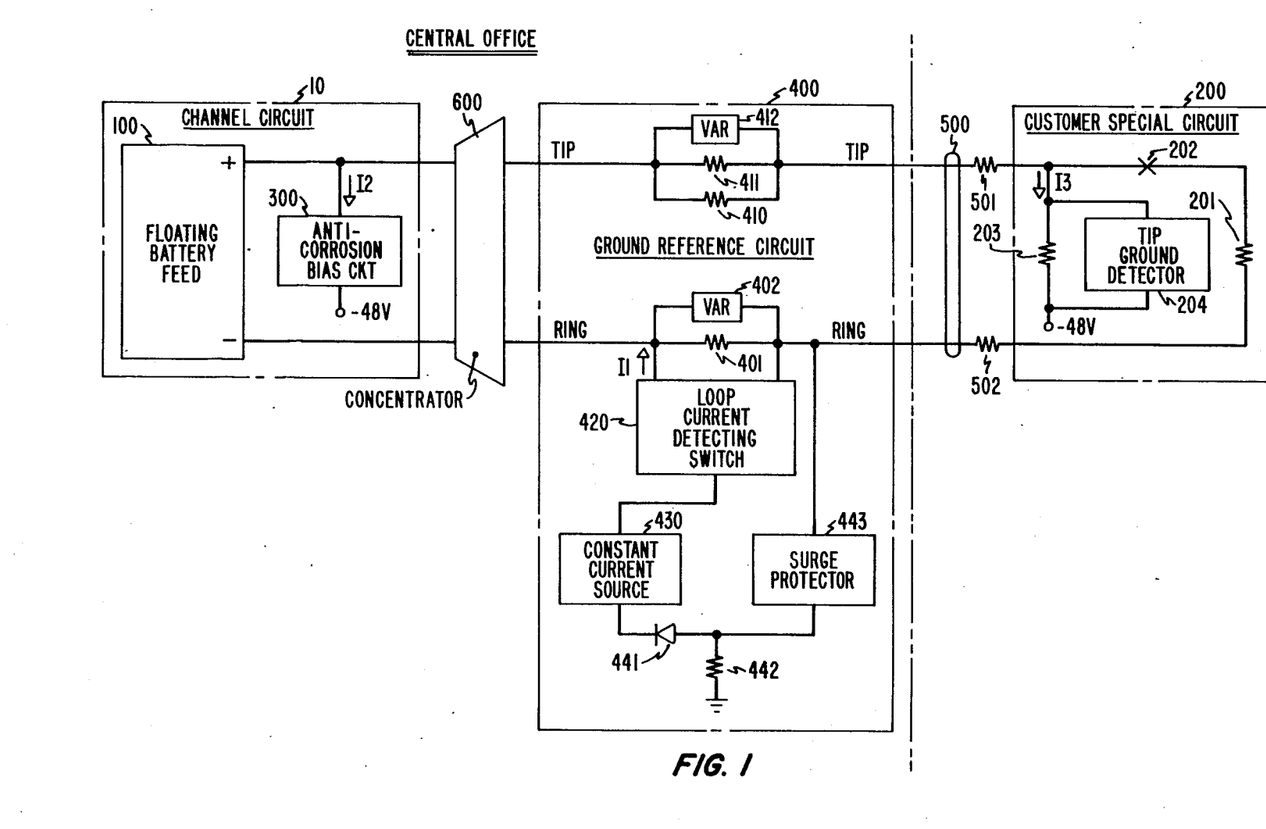
FIG. 1 is a diagram of an exemplary arrangement in accordance with the invention providing a ground reference to a customer special circuit powered by an otherwise floating battery feed circuit.

The exemplary arrangement of FIG. 1 has a channel circuit 10 including a floating battery feed 100 such as that described in the above-mentioned Hudson et al. patent, to provide power via a customer loop 500 to a customer special circuit 200. The voltage and current provided by battery feed 100 varies with the applied load such that a constant magnitude of power is supplied. As an example, for a particular load, battery feed 100 supplies 33 volts at 40 milliamperes. The resistance of the tip and ring conductors of customer loop 500 is shown in FIG. 1 by two resistors 501 and 502. Special circuit 200 may represent any of a number of PBX or carrier system circuits that require a tip ground reference during the talk state, i.e., when loop current is flowing. As used herein the term loop current refers to current that flows only in the conductors of loop 500 while the term ground current refers to current that flows both in the conductors of loop 500 and in the ground.

Channel circuit 10 is connected behind a concentrator 600, implemented using semiconductor crosspoints each comprising two gated diode switches of the type described in detail in the patent application of A. R. Hartman et al., Ser. No. 333,461, filed Dec. 22, 1981, and assigned to the same assignee as the present application. As mentioned, concentrator 600 is included so that a plurality of channel circuits can economically serve a larger plurality of customer loops.

Figure 4:
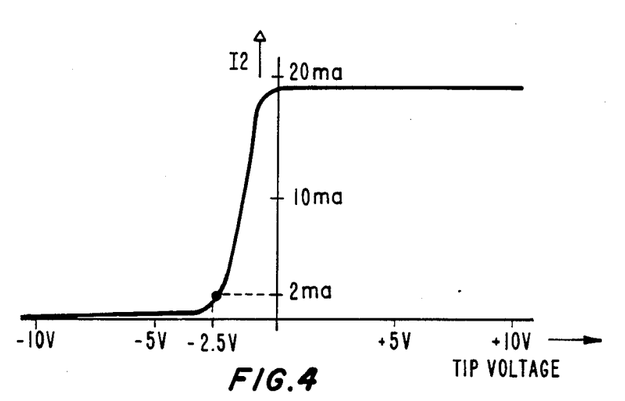
FIG. 4 is a voltage-current characteristic curve associated with the biasing circuit of FIG. 3.

Channel circuit 10 includes an anti-corrosion bias (ACB) circuit 300 to prevent positive potentials from developing on either the tip or ring conductors of customer loop 500. Such positive potentials are known to cause corrosion. ACB circuit 300, which is described in detail later herein, senses voltage on the tip conductor and sinks a variable magnitude of ground current I2 to the −48 V terminal of the office DC source (not shown) such that the tip conductor remains at a negative potential. The ring conductor is maintained negative with respect to the tip conductor by floating battery feed 100. The voltage-current characteristic associated with ACB circuit 300 is shown in FIG. 4.

Customer special circuit 200 includes contacts 202 which are closed in the talk state such that loop current is provided to a resistor 201. Special circuit 200 also includes a resistor 203 and a tip ground detector 204 connected in parallel between the tip conductor of loop 500 and the −48 V terminal of a customer DC source (not shown). When the tip conductor of loop 500 is grounded, a sufficient magnitude of ground current I3 flows through resistor 203 to develop a voltage above a predetermined threshold. The threshold is used by detector 204 to detect a grounded tip condition, which detection is used for the subsequent proper operation of special circuit 200 in a manner unimportant to the present description. The components of special circuit 200 are shown in FIG. 1 only to illustrate the general characteristics of such circuits relevant to the present invention.

A ground reference circuit 400 is connected between concentrator 600 and customer loop 500 in accordance with the invention to provide the tip ground condition required by special circuit 200 during the talk state. Ground reference circuit 400 includes a constant current source 430, which supplies a fixed magnitude of ground current, I1, e.g., 3 milliamperes, from ground to the ring conductor of loop 500, only when loop current is flowing in loop 500. The supplied current I1 is of sufficient magnitude to provide the current I3 needed for tip ground detection by detector 204. Any additional magnitude of the constant current I1 is drawn as the current I2 by ACB circuit 300 to maintain the tip conductor slightly negative. For example, if a current I3 of 1 milliampere flows in resistor 203, the remaining current of 2 milliamperes is drawn as the current I2 by ACB circuit 300 and the tip voltage is maintained at approximately −2.5 volts (FIG. 4). Since in this example, a 1 milliampere current flowing in resistor 203 causes the detection of a tip ground condition by detector 204, the tip voltage of −2.5 volts is sufficiently close to ground to allow the proper operation of special circuit 200.

Figure 2:
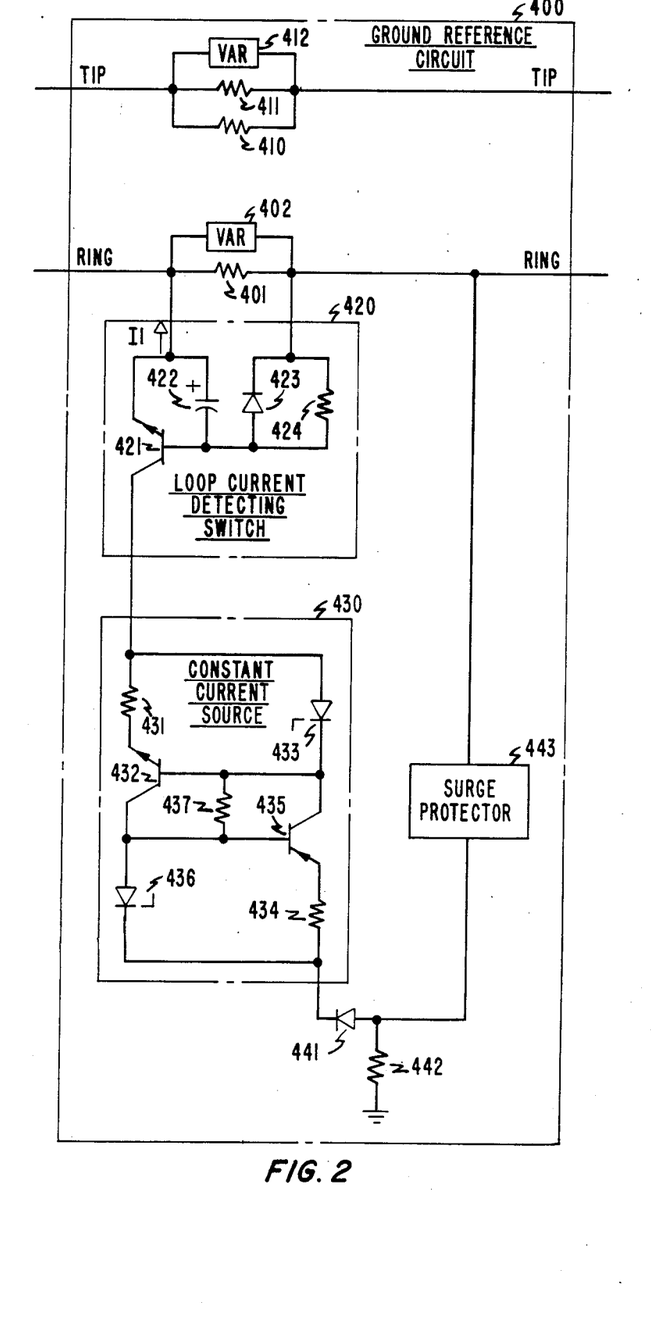
FIG. 2 is a more detailed circuit diagram of the ground reference circuit included in the arrangement of FIG. 1.

Ground reference circuit 400 is shown in greater detail in FIG. 2. As mentioned above, constant current source 430 supplies the ground current I1 to the ring conductor only when loop current is flowing. This prevents the operation of current source 430 from causing anomalous operation during other loop states, as for example, during line insulation testing. A loop current detecting switch 420 is included in ground reference circuit 400 to control the flow of the current I1. A resistor 401, e.9., 50 ohms, in inserted in the ring conductor to sense loop current flow. When a loop current flows in excess of approximately 10 milliamperes, resistor 401 develops sufficient voltage to forward bias an NPN transistor 421 to conduct the current from constant current source 430 to the ring conductor of loop 500. A capacitor 422 connected between the base and emitter of transistor 421, keeps transistor 421 from being turned on during the application of ringing voltage to loop 500. Capacitor 422 charges up during the positive cycles of the ringing voltage and holds transistor 421 reverse biased during the negative cycles. A resistor 424, e.g., 1000 ohms, limits the magnitude of base current supplied to transistor 421. A diode 423 is connected across resistor 424 to speed the charging of capacitor 422.

Constant current source 430 is comprised of two constant current sources each of which supplies 1.5 milliamperes. An NPN transistor 432, an emitter resistor 431, and a zener diode 433 comprise the first current source. A PNP transistor 435, an emitter resistor 434, and a zener diode 436 comprise the second current source. A constant current of 1.5 milliamperes flows from the collector of transistor 435 through zener diode 433, which maintains a voltage of approximately 6.2 volts. The constant zener diode b 433 voltage maintains the current flow from the emitter of transistor 432 through resistor 431 at the constant value of 1.5 milliamperes. Similarly, a constant current of 1.5 milliamperes flows to the collector of transistor 432 from zener diode 436, which also maintains a voltage of approximately 6.2 volts. The constant zener diode 436 voltage maintains the current flow to the emitter of transistor 435 from resistor 434 at the constant value of 1.5 milliamperes. A resistor 437, e.g., 10 megohms, is connected between the base terminals of the transistors 432 and 435 to provide a base current path when transistor 432 and 435 are initially being turned on. The symmetrical, two current source implementation allows constant current source 430 to provide 3 milliamperes to the ring conductor of loop 500 without requiring an additional DC supply. In effect, current source 430 is controlling the otherwise variable magnitude of ground current being drawn from the tip conductor by ACB circuit 300 (I1=I2+I3). It should be noted that a constant current could alternatively be supplied to the tip conductor rather than the ring conductor, but the ground reference circuit associated with the tip conductor would have to be powered by an additional DC source.

To maintain a balance in the tip and ring conductor paths, resistors 410 and 411 are inserted in the tip conductor path. The resistance of resistor 411 is selected to be equal to that of resistor 401. The resistance of resistor 410 is made to approximate the resistance of the additional circuitry connected to the ring conductor. Two varistors 402 and 412 are connected across resistors 401 and 411 respectively for lightning protection. In addition, a surge protector 443 is connected from the ring conductor and via a resistor 442 to ground, also to protect current source 430 and loop current detecting switch 420 from being damaged by lightning. A diode 441 connected between resistor 442 and current source 430 prevents current from flowing to current source 430 in response to a lightning strike. Diode 441 also blocks positive ringing voltages of up to 190 volts to prevent false ring trip.

Figure 3:
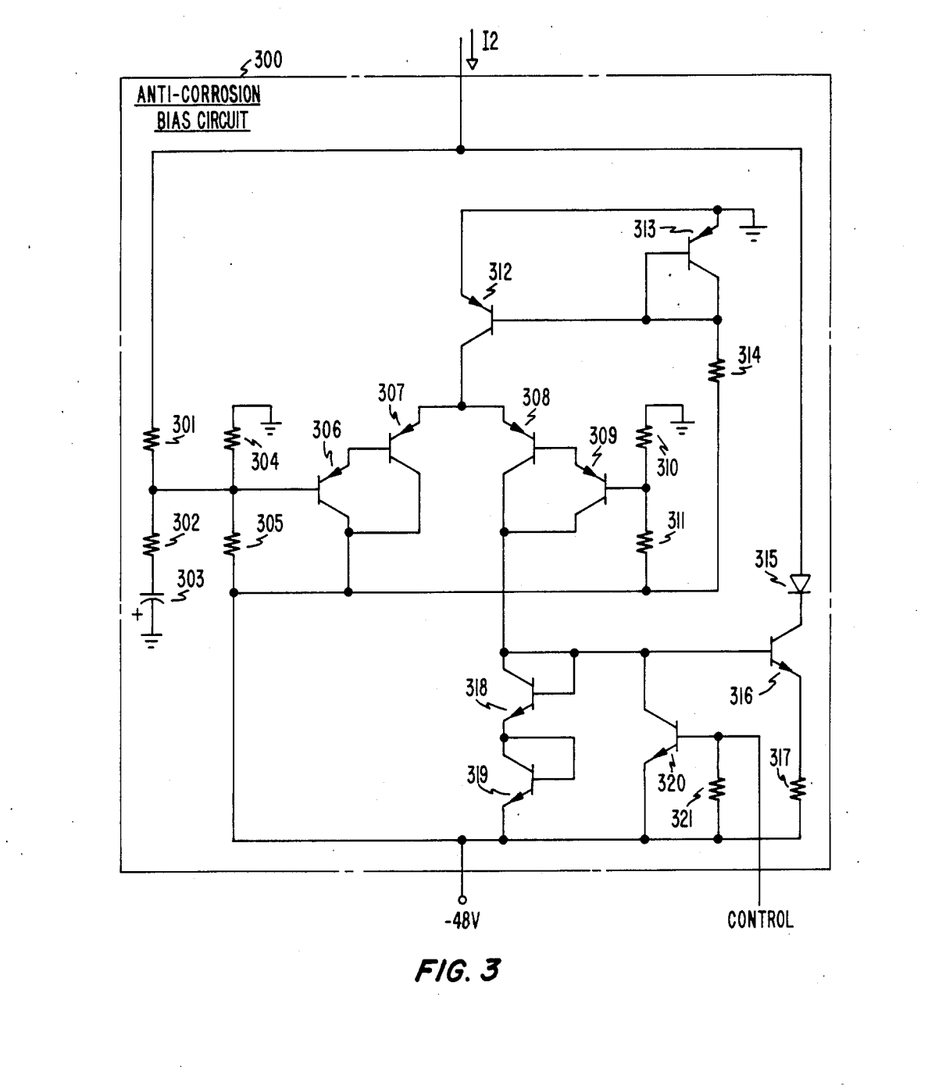
FIG. 3 is a circuit diagram of an anti-corrosion biasing circuit included in the arrangement of FIG. 1.

Anti-corrosion bias (ACB) circuit 300 is shown in greater detail in FIG. 3. ACB circuit 300 is designed to sink just enough ground current from the tip conductor of loop 500 to maintain a slightly negative voltage on that conductor. The voltage-current characteristic achieved by ACB circuit 300 is given in FIG. 4. The biasing is accomplished using a current-sinking transistor 316, controlled by a voltage sensing circuit implemented with a differential amplifier. Transistors 312 and 313 in conjunction with resistor 314 comprise a constant current source that provides a predetermined current, e.g., 220 microamperes, to a differential amplifier comprising transistors 306 through 309. A voltage divider comprising resistors 310 and 311 establishes a voltage reference, e.g., −2.7 volts, at the transistor 309 base terminal input of the differential amplifier. The tip voltage is applied via a resistor 301, e.g., 1 megohm, to the transistor 306 base input terminal of the differential amplifier. A divider network comprising resistors 304 and 305 is included to approximately balance the divider network comprising resistors 310 and 311. A resistor 302 and a capacitor 303 are connected between the transistor 306 base terminal and ground to enhance circuit stability. When the DC level on the tip conductor rises above the −2.7 volt reference, the majority of current from transistor 312 is provided via transistors 308 and 309 to the base terminal of current-sinking transistor 316. This results in additional current being drawn from the tip conductor via a diode 315, transistor 316 and a resistor 317 to the −48V terminal of the office DC source. If on the other hand, the DC level on the tip conductor is more negative than the −2.7 volt reference, the majority of current from transistor 312 flows through the transistors 306 and 307 of the differential amplifier causing a rise in the tip voltage.

In order to protect the circuit, resistor 317 limits the current that can be drawn by transistor 316. Current in excess of a predetermined limit will result in a voltage drop across the resistor 317 and the base-emitter junction of transistor 316, sufficient to forward bias the two transistors 318 and 319 used as series-connected diodes. In addition, ACB circuit 300 can be disabled by injecting a predetermined current via a control input into the base terminal of a transistor 320, having a resistor 321 connected between its base terminal and the −48 V terminal of the office DC source. Providing the predetermined current to the control input effectively clamps transistor 316 in the off state.

Figure 5:
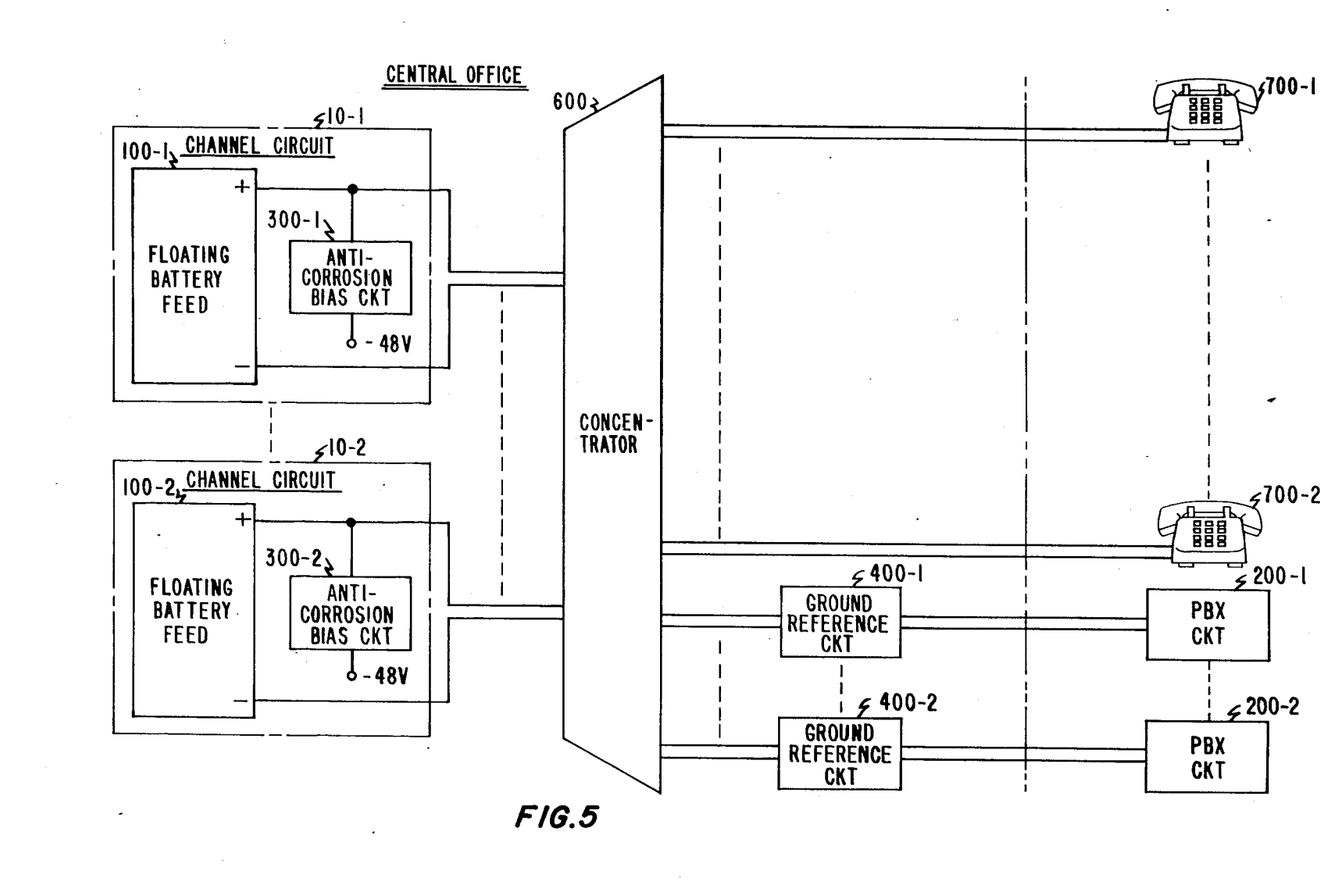
FIG. 5, is a diagram of an arrangement where a number of floating-feed channel circuits power a greater number of customer circuits, e.g., conventional customer sets and special PBX circuits, illustrating the inclusion of an anti-corrosion biasing circuit (FIG. 3) in each channel circuit but the inclusion of a ground reference circuit (FIG. 2) advantageously in only the customer loops serving the special PBX circuits.

FIG. 5 is a diagram of an arrangement where a number of floating-feed channel circuits, e.g., 10-1 and 10-2, power a greater number of customer circuits, e.g., conventional customer sets 700-1 and 700-2 and special PBX circuits 200-1 and 200-2 of the type requiring a grounded tip reference in the talk state. Each channel circuit includes a floating battery feed and an anti-corrosion biasing circuit of the type shown in FIG. 3. For example, channel circuit 10-1 includes floating battery feed 100-1 and ACB circuit 300-1 and channel circuit 10-2 includes floating battery feed 100-2 and ACB circuit 300-2.

Any channel circuit can be used to power any of the customer circuits accessible via concentrator 600. Since each channel circuit includes an anti-corrosion biasing circuit, corrosion is prevented on all customer loops as is desired. The economies inherent in concentration are advantageously obtained in the provision of the anti-corrosion biasing circuits. Such economies are achieved, even though the special PBX circuits 200-1 and 200-2 require a grounded tip reference in the talk state, by including a ground reference circuit of the type shown in FIG. 2 in each customer loop serving a special PBX circuit. For example, ground reference circuits 400-1 and 400-2 are included in the customer loops associated with PBX circuits 200-1 and 200-2.

It is to be understood that the above-described embodiment is merely illustrative of the principles of the invention and that other embodiments may be devised by those skilled in the art without departing from the spirit and scope of the invention.

What is claimed is:

1. An arrangement for interfacing a floating battery feed via a customer loop comprising tip and ring conductors, to a customer circuit, said arrangement comprising biasing means coupled to said battery feed and said tip conductor and responsive to a voltage on said tip conductor for sinking a variable magnitude of ground current from said tip conductor dependent on said tip conductor voltage to prevent said tip conductor voltage from becoming positive with respect to ground, means for supplying a constant ground current to said ring conductor of said loop, said constant ground current being independent of a voltage on said ring conductor and a portion of said constant ground current being supplied via said loop to said customer circuit and means responsive to a loop current in said loop for enabling the supplying of said constant ground current from said supplying means to said ring conductor, wherein said enabling means comprises switch means responsive to said loop current in said loop for coupling said supplying means to said ring conductor.

2. An arrangement in accordance with claim 1 wherein said supplying means comprises NPN transistor means interposed between said switch means and ground for providing a first part of said constant ground current and PNP transistor means interposed between said switch means and ground for providing a second part of said constant ground current.

3. An arrangement in accordance with claim 2 wherein a base terminal of said NPN transistor means is connected to a collector terminal of said PNP transistor means, wherein a base terminal of said PNP transistor means is connected to a collector terminal of said NPN transistor means and wherein said supplying means further comprises first emitter resistor means connected between an emitter terminal of said NPN transistor means and said switch means, first zener diode means connected between said base terminal of said NPN transistor means and said switch means for maintaining a constant voltage across a base-emitter junction of said NPN transistor means and said first emitter resistor means, second emitter resistor means connected between an emitter terminal of said PNP transistor means and ground and second zener diode means connected between said base terminal of said PNP transistor means and ground for maintaining a constant voltage across a base-emitter junction of said PNP transistor means and said second emitter resistor means.

4. An arrangement in accordance with claim 1 wherein said customer circuit requries the supplying of at least a predetermined magnitude of ground current from said tip conductor for the proper operation of said customer circuit, wherein said portion of said constant ground current supplied to said customer circuit is at least equal to said predetermined magnitude, and wherein said biasing means sinks ground current substantially equal to the difference between said contant ground current and said portion supplied to said customer circuit.

5. A ground reference circuit for interfacing a floating battery feed via a customer loop comprising tip and ring conductors, to a customer circuit, said ground reference circuit comprising means for supplying a constant ground current to said ring conductor of said loop, said constant ground current being independent of a voltage on said ring conductor and a portion of said constant ground current being supplied via said loop to said customer circuit and means responsive to a loop current in said loop for enabling the supplying of said contant ground current from said supplying means to said ring conductor.

wherein said enabling means comprises switch means responsive to said loop current in said loop for coupling said supplying means to said ring conductor.

6. A ground reference circuit in accordance with claim 5 wherein said supplying means comprises NPN transistor means interposed between said switch means and ground for providing a first part of said constant ground current and PNP transistor means interposed between said switch means and ground for providing a second part of said constant ground current.

7. A ground reference circuit in accordance with claim 6 wherein a base terminal of said NPN transistor means is connected to a collector terminal of said PNP transistor means, wherein a base terminal of said PNP transistor means is connected to a collector terminal of said NPN transistor means and wherein said supplying means further comprises first emitter resistor means connected between an emitter terminal of said NPN transistor means and said switch means, first zener diode means connected between said base terminal of said NPN transistor means and said switch means for maintaining a constant voltage across a base-emitter junction of said NPN transistor means and said first emitter resistor means, second emitter resistor means connected between an emitter terminal of said PNP transistor means and ground and second zener diode means connected between said base terminal of said PNP transistor means and ground for maintaining a constant voltage across a base-emitter junction of said PNP transistor means and said second emitter resistor means.

8. An arrangement for interfacing a floating battery feed via a customer loop comprising tip and ring conductors, to a customer circuit, said arrangement comprising biasing means coupled to said battery feed and said tip conductor and responsive to a voltage on said tip conductor for sinking a variable magnitude of ground current from said tip conductor dependent on said tip conductor voltage to prevent said tip conductor voltage from becoming positive with respect to ground, means for supplying a constant ground current to said ring conductor of said loop, said constant ground current being independent of a voltage on said ring conductor and a portion of said constant ground current being supplied via said loop to said customer circuit, and means responsive to a loop current in said loop for enabling the supplying of said constant ground current from said supplying means to said ring conductor, wherein said enabling means and said supplying means are powered exclusively via said loop.

9. An arrangement in accordance with claim 8 wherein said enabling means comprises switch means responsive to said loop current in said loop for coupling said supplying means to said ring conductor.

10. An arrangement in accordance with claim 9 wherein said supplying means comprises NPN transistor means interposed between said switch means and ground for providing a first part of said constant ground current and PNP transistor means interposed between said switch means and ground for providing a second part of said constant ground current.

11. An arrangement in accordance with claim 10 wherein a base terminal of said NPN transistor means is connected to a collector terminal of said PNP transistor means, wherein a base terminal of said PNP transistor means is connected to a collector terminal of said NPN transistor means and wherein said supplying means further comprises first emitter resistor means connected between an emitter terminal of said NPN transistor means and said switch means, first zener diode means connected between said base terminal of said NPN transistor means and said switch means for maintaining a constant voltage across a base-emitter junction of said NPN transistor means and said first emitter resistor means, second emitter resistor means connected between an emitter terminal of said PNP transistor means and ground and second zener diode means connected between said base terminal of said PNP transistor means and ground for maintaining a constant voltage across a base-emitter junction of said PNP transistor means and said second emitter resistor means.

12. An arrangement in accordance with claim 8 wherein said customer circuit requries the suppling of at least a predetermined magnitude of ground current from said tip conductor for the proper operation of said customer circuit, wherein said portion of said constant ground current supplied to said customer circuit is at least equal to said predetermined magnitude, and wherein said biasing means sinks ground current substantially equal to the difference between said constant ground current and said portion supplied to said customer circuit.

13. A ground reference circuit for interfacing a floating battery feed via a customer loop comprising tip and ring conductors, to a customer circuit, said ground reference circuit comprising means for supplying a constant ground current to said ring conductor of said loop, said constant ground current being independent of a voltage on said ring conductor and a portion of said constant ground current being supplied via said loop to said customer circuit and means responsive to a loop current in said loop for enabling the supplying of said constant ground current from said supplying means to said ring conductor, wherein said enabling means and said supplying means are powered exclusively via said loop.

14. A ground reference circuit in accordance with claim 13 wherein said enabling means comprises switch means responsive to said loop current in said loop for coupling said supplying means to said ring conductor.

15. A ground reference circuit in accordance with claim 14 wherein said supplying means comprises NPN transistor means interposed between said switch means and ground for providing a first part of said constant ground current and PNP transistor means interposed between said switch means and ground for providing a second part of said constant ground current.

16. A ground reference circuit in accordance with claim 15 wherein a base terminal of said NPN transistor means is connected to a collector terminal of said PNP transistor means, wherein a base terminal of said PNP transistor means is connected to a collector terminal of said NPN transistor means and wherein said supplying means further comprises first emitter resistor means connected between an emitter terminal of said NPN transistor means and said switch means, first zener diode means connected between said base terminal of said NPN transistor means and said switch means for maintaining a constant voltage across a base-emitter junction of said NPN transistor means and said first emitter resistor means, second emitter resistor means connected between an emitter terminal of said PNP transistor means and ground and second zener diode means connected between said base terminal of said PNP transistor means and ground for maintaining a constant voltage across a base-emitter junction of said PNP transistor means and said second emitter resistor means.

* * * * *